(12) United States Patent
Wang et al.

(10) Patent No.: US 10,573,958 B2
(45) Date of Patent: Feb. 25, 2020

(54) ANTENNA AND NETWORK DEVICE

(71) Applicant: HUAWEI TECHNOLOGIES CO., LTD., Shenzhen (CN)

(72) Inventors: Naibiao Wang, Shenzhen (CN); Weihong Xiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/455,734

(22) Filed: Jun. 27, 2019

(65) Prior Publication Data

US 2019/0319343 A1    Oct. 17, 2019

Related U.S. Application Data

(63) Continuation of application No. PCT/CN2016/113156, filed on Dec. 29, 2016.

(51) Int. Cl.

| | |
|---|---|
| *H04M 1/00* | (2006.01) |
| *H01Q 1/24* | (2006.01) |
| *H01Q 3/24* | (2006.01) |
| *H01Q 1/38* | (2006.01) |
| *H01Q 3/38* | (2006.01) |
| *H04W 16/28* | (2009.01) |

(52) U.S. Cl.
CPC ............ *H01Q 1/246* (2013.01); *H01Q 1/38* (2013.01); *H01Q 3/247* (2013.01); *H01Q 3/38* (2013.01); *H04W 16/28* (2013.01)

(58) Field of Classification Search
CPC .......... H01Q 1/246; H01Q 1/38; H01Q 3/247; H01Q 3/38; H04W 16/28

USPC ....................................................... 455/562.1
See application file for complete search history.

(56) References Cited

U.S. PATENT DOCUMENTS

| | | | |
|---|---|---|---|
| 2,609,503 A | 9/1952 | Middlemark | |
| 5,995,062 A * | 11/1999 | Denney | H01Q 1/1235 343/700 MS |
| 6,037,910 A * | 3/2000 | Solbach | H01Q 3/36 343/771 |
| 6,144,339 A * | 11/2000 | Matsumoto | H01Q 21/0025 342/361 |
| 6,388,631 B1 * | 5/2002 | Livingston | H01Q 3/24 342/374 |

(Continued)

FOREIGN PATENT DOCUMENTS

| | | |
|---|---|---|
| CH | 331382 A | 7/1958 |
| CN | 102142327 A | 8/2011 |

(Continued)

*Primary Examiner* — Marceau Milord

(74) *Attorney, Agent, or Firm* — Kilpatrick Townsend & Stockton LLP

(57) ABSTRACT

An array antenna and a network device are provided. The array antenna includes n radiating elements, a power splitter or a phase shifter, and a switching switch. The power splitter or the phase shifter includes n output ends and m input ends. The switching switch includes m first ports, K second ports, and a switch element, where the m first ports are respectively connected to the m input ends; and the K second ports are configured to couple an input signal. The switch element is configured to switch a connection relationship between the m first ports and the K second ports, so as to selectively output the input signal to at least one first port.

11 Claims, 16 Drawing Sheets

(56) References Cited

U.S. PATENT DOCUMENTS

| | | | | |
|---|---|---|---|---|
| 6,559,798 B1* | 5/2003 | Marumoto | H01Q 3/2605 | 342/372 |
| 6,738,016 B2* | 5/2004 | Li | H01Q 21/00 | 342/360 |
| 6,750,810 B2* | 6/2004 | Shinoda | G01S 13/4463 | 342/149 |
| 6,853,329 B2* | 2/2005 | Shinoda | G01S 13/4463 | 342/149 |
| 7,321,339 B2* | 1/2008 | Mohamadi | H01P 1/184 | 343/700 MS |
| 7,889,129 B2* | 2/2011 | Fox | H01Q 1/288 | 342/354 |
| 8,385,868 B2* | 2/2013 | Lee | H01Q 1/1271 | 375/347 |
| 8,648,268 B2* | 2/2014 | Ashcroft | H01P 1/125 | 200/11 R |
| 9,231,292 B2* | 1/2016 | Koo | G06K 19/0713 | |
| 10,028,334 B2* | 7/2018 | Xiao | G06K 7/00 | |
| 10,132,918 B2* | 11/2018 | Wada | G01S 7/282 | |
| 10,218,068 B1* | 2/2019 | Loui | H01Q 3/267 | |
| 10,243,278 B2* | 3/2019 | Xiao | H01Q 1/246 | |
| 2003/0164791 A1 | 9/2003 | Shinoda et al. | | |
| 2004/0157645 A1 | 8/2004 | Smith et al. | | |
| 2005/0035915 A1* | 2/2005 | Livingston | H01Q 1/422 | 343/754 |
| 2006/0234694 A1* | 10/2006 | Kawasaki | H01Q 3/267 | 455/423 |
| 2006/0293013 A1 | 12/2006 | Gazit et al. | | |
| 2008/0150800 A1* | 6/2008 | Tsuji | H01P 1/185 | 342/368 |
| 2009/0277762 A1 | 11/2009 | Nakatsuka et al. | | |
| 2011/0162943 A1 | 7/2011 | Ashcroft | | |
| 2017/0353338 A1* | 12/2017 | Amadjikpe | H01Q 9/0407 | |
| 2019/0044568 A1* | 2/2019 | Yamaguchi | H01Q 3/267 | |

FOREIGN PATENT DOCUMENTS

| | | |
|---|---|---|
| CN | 102142888 A | 8/2011 |
| CN | 102646874 A | 8/2012 |
| CN | 102856667 A | 1/2013 |
| CN | 203277596 U | 11/2013 |
| CN | 104135300 A | 11/2014 |
| CN | 106099367 A | 11/2016 |
| CN | 106207461 A | 12/2016 |
| JP | S6436202 A | 2/1989 |
| WO | 2004088787 A3 | 3/2005 |
| WO | 2012159345 A1 | 11/2012 |

* cited by examiner

ANTENNA AND NETWORK DEVICE

CROSS-REFERENCE TO RELATED APPLICATIONS

This application is a continuation of International Application No. PCT/CN2016/113156, filed on Dec. 29, 2016, the disclosure of which is hereby incorporated by reference in its entirety.

TECHNICAL FIELD

This application relates to the field of antenna technologies, and in particular, to an array antenna and a network device.

BACKGROUND

With development of mobile communications technologies, users impose increasingly high requirements for high-speed data transmission, and user requirements are also increasingly diversified in type. Modern mobile communication needs to meet high-speed wireless access requirements in diversified scenarios. Upgrade of mobile communications devices gradually speeds up. However, it becomes more difficult to obtain an available station resource in an urban area. Therefore, a base station antenna capable of satisfying requirements a plurality of deployed sites and working in diversified scenarios becomes one of development directions of the base station antenna in the future. The base station antenna capable of working in diversified scenarios also provides a more effective approach for implementing site sharing for mobile communications operators. This meets a smooth upgrade requirement of an existing device and a green energy saving requirement.

For the base station antenna capable of working in diversified scenarios, the antenna is required to provide, depending on a different application scenario, a different operating state that meets a requirement of the application scenario, and the base station antenna is also required to be miniaturized. Therefore, to meet both a requirement of an appropriate antenna size and indicator requirements in a plurality of application scenarios, an array design innovation is required for the base station antenna in diversified application scenarios.

In the prior art, a distance between a reflective plate side of an antenna and a radiating element is adjusted by moving a position of the reflective plate side, to change a surrounding environment of the radiating element. In this way, current distribution on the radiating element, a bottom surface of the reflective plate, and the reflective plate side is changed, so as to change a beam width of a radiation directivity pattern of the antenna.

However, adjusting the reflective plate side slightly affects the current distribution, and therefore, the beam width changes in a relatively small range.

SUMMARY

This application provides an array antenna, to flexibly change a beam width of a radiation directivity pattern of an antenna.

An embodiment of this application provides an array antenna, including:

n radiating elements;

a power splitter or a phase shifter, including n output ends and m input ends, where the n output ends are respectively connected to the n radiating elements, and any one of the m input ends is connected to at least one of then output ends; and a switching switch, including m first ports, K second ports, and a switch element, where the m first ports are respectively connected to the m input ends; the K second ports are configured to couple an input signal; and the switch element is configured to switch a connection relationship between the m first ports and the K second ports, so as to selectively output the input signal to at least one first port; where n and m are integers greater than 1, and K is an integer greater than or equal to 1.

In this way, the switching switch controls transmission or interruption of a signal that is output to the n radiating elements, and sets a quantity of radiating elements in an operating state, so as to flexibly change a beam width of a radiation directivity pattern of an antenna. In addition, because the switching switch for setting a radiating element to an operating or non-operating state has a simple structure, and causes a relatively small introduced insertion loss, gains of the antenna are relatively high.

Optionally, the switch element includes p fixed strips and q movable strips.

Ends of m fixed strips in the p fixed strips act as the m first ports, the q movable strips are selectively connected to the p fixed strips, and m≤p.

In this way, a plurality of fixed strips and movable strips are disposed in the switching switch, so that a position of a movable strip can be flexibly changed to implement a plurality of selective connections between the movable strips and the fixed strips, and further to flexibly control the quantity of radiating elements in an operating state.

Optionally, ends of K fixed strips in the p fixed strips act as the K second ports, and K≤p.

Optionally, the p fixed strips include a first fixed strip to a fourth fixed strip, where the first fixed strip, the second fixed strip, and the fourth fixed strips are respectively connected to the first input end to the third input end, and an end of the third fixed strip acts as the second port; and the q movable strips include a first movable strip to a third movable strip.

That the q movable strips are selectively connected to the p fixed strips is specifically:

the first movable strip is connected to the first fixed strip and the third fixed strip; or the second movable strip is connected to the first fixed strip and the second fixed strip, and the third movable strip is connected to the third fixed strip and the fourth fixed strip.

Optionally, the n output ends include a first output end to a sixth output end, and the m input ends include the first input end to the third input end, where the first input end is connected to the first output end;

the second input end is connected to the second output end, the third output end, the fourth output end, the fifth output end, and the sixth output end; and the third input end is connected to the second output end, the third output end, the fourth output end, the fifth output end, and the sixth output end.

Optionally, the p fixed strips include a first fixed strip to a fifth fixed strip, where the first fixed strip to the fourth fixed strip are respectively connected to the first input end to the fourth input end, and an end of the fifth fixed strip acts as the second port; and the q movable strips include a first movable strip to a fifth movable strip.

That the q movable strips are selectively connected to the p fixed strips is specifically:

the third movable strip is connected to the first fixed strip and the fifth fixed strip; or the second movable strip is connected to the first fixed strip and the second fixed strip, and the fifth movable strip is connected to the third fixed strip and the fifth fixed strip; or the first movable strip is connected to the first fixed strip and the second fixed strip, and the fourth movable strip is connected to the third fixed strip, the fourth fixed strip, and the fifth fixed strip.

Optionally, the n output ends include a first output end to a sixth output end, and the m input ends include the first input end to the fourth input end, where the first input end is connected to the first output end;

the second input end is connected to the second output end and the third output end;

the third input end is connected to the second output end and the third output end; and the fourth input end is connected to the fourth output end, the fifth output end, and the sixth output end.

Optionally, the switch element further includes a pull rod, and the pull rod is connected to at least one of the q movable strips.

In this way, disposing the pull rod provides a specific manner of changing the position of the movable strip, and facilitates electrical or manual control of the movable strip.

Optionally, the q movable strips are selectively connected to the p fixed strips in an electrical manner or capacitive coupling manner.

Optionally, both the p fixed strips and the q movable strips are metal strips or copper foil strips of a printed circuit board PCB.

Optionally, the n radiating elements are sequentially arranged in a horizontal direction or in a vertical direction.

This application further provides a network device, including the array antenna according to any one of the foregoing implementations.

According to the foregoing content, the array antenna in this application includes: the n radiating elements; the power splitter or the phase shifter, including the n output ends and the m input ends, where the n output ends are respectively connected to the n radiating elements, and the any one of the m input ends is connected to the at least one of the n output ends; and the switching switch, including the m first ports, the K second ports, and the switch element, where the m first ports are respectively connected to the m input ends, the K second ports are configured to couple the input signal, and the switch element is configured to switch the connection relationship between the m first ports and the K second ports, so as to selectively output the input signal to the at least one first port. Based on the foregoing structure, the switching switch is configured to control transmission or interruption of a signal that is output to the n radiating elements, and set the quantity of radiating elements in an operating state, so as to flexibly change the beam width of the radiation directivity pattern of the antenna. In addition, because the switching switch for setting the radiating element to an operating or non-operating state has a simple structure, and causes a relatively small introduced insertion loss, gains of the antenna are relatively high.

DESCRIPTION OF EMBODIMENTS

The following describes the embodiments of this application in detail with reference to the accompanying drawings of this specification.

This application provides an array antenna that can flexibly change a beam width of a radiation directivity pattern of an antenna.

Embodiment 1

Figure 1A:
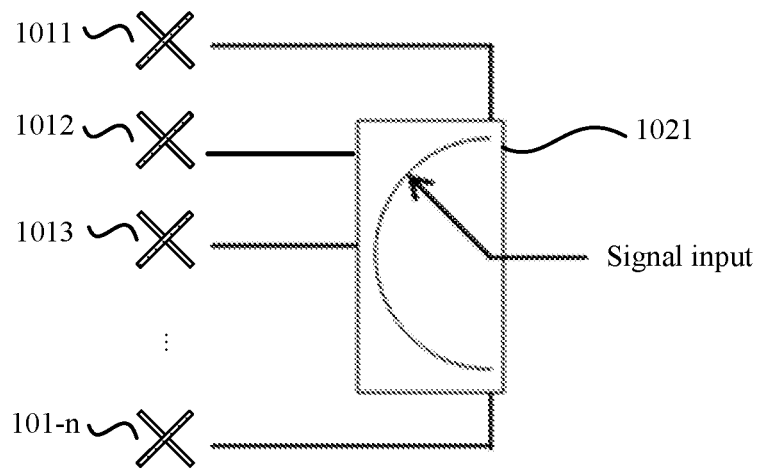
FIG. 1a is a schematic diagram of an array antenna according to Embodiment 1 of this application.

FIG. 1a is a schematic diagram of an array antenna according to Embodiment 1 of this application. As shown in FIG. 1a, the array antenna includes:

n radiating elements, for example, a radiating element 1011, a radiating element 1012, a radiating element 1013, . . . , and a radiating element 101n; and a feeding network, where the feeding network includes a switching switch 1021, and the switching switch 1021 is connected to the n radiating elements.

Based on the foregoing structure, the switching switch 1021 may control transmission or interruption of a signal that is output by the feeding network to the n radiating elements, and set a quantity of radiating elements in an operating state, that is, set different operating modes, so as to flexibly change a beam width of a radiation directivity pattern of an antenna. The n radiating elements may be single-polarized radiating elements, or may be dual-polarized radiating elements, and a balun corresponding to each polarization direction of a radiating element has signal excitation provided by a corresponding feeding network.

It should be noted that, n is a positive integer, and a specific value of n may be set by persons skilled in the art according to an actual situation. To flexibly change the beam width of the radiation directivity pattern of the antenna, the value of n may be greater than or equal to 2.

Figure 1B:
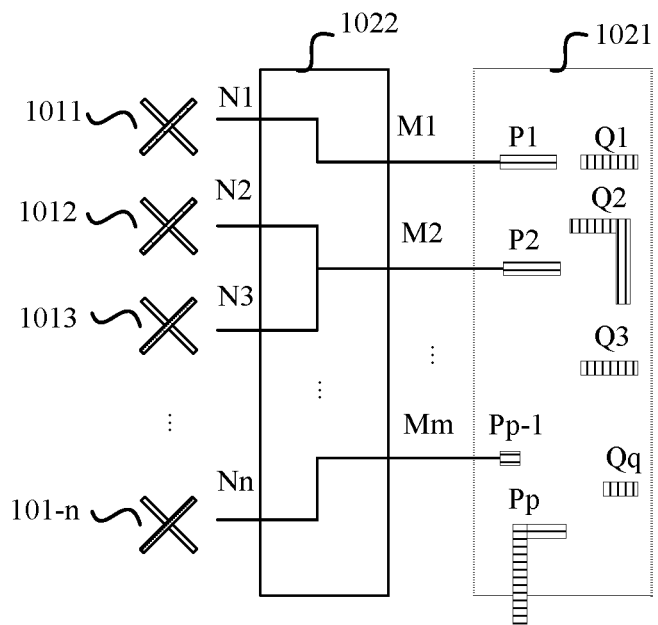
FIG. 1b is a specific schematic structural diagram of an array antenna according to Embodiment 1 of this application.

FIG. 1b is a specific schematic structural diagram of an array antenna according to Embodiment 1 of this application. As shown in FIG. 1b, the array antenna includes:

n radiating elements, for example, a radiating element 1011, a radiating element 1012, a radiating element 1013, . . . , and a radiating element 101n; and a feeding network, where the feeding network includes a switching switch 1021, and a power splitter or a phase shifter 1022; the power splitter or the phase shifter 1022 includes n output ends (N1, N2, N3, . . . , and Nn) and m input ends (M1, M2, . . . , and Mm); any one of the m input ends is connected to at least one of the n output ends; and the n radiating elements are respectively connected to the n output ends. It should be noted that, in this application, a connection between an input end and an output end means that a signal flowing into the input end may arrive at the output end. To be specific, the signal flowing into the input end may arrive at the output end after being processed in the power splitter or the phase shifter, or may directly arrive at the output end without being processed. This is not specifically limited.

Further, the switching switch 1021 includes m first ports, K second ports, and a switch element, where the m first ports are respectively connected to the m input ends; the K second ports are configured to couple an input signal; and the switch element is configured to switch a connection relationship between the m first ports and the K second ports, so as to selectively output the input signal to at least one first port.

The switch element includes p fixed strips (P1, P2, . . . , Pp-1, and Pp) and q movable strips (Q1, Q2, Q3, . . . , and Qq), where ends of m fixed strips in the p fixed strips act as the m first ports and are respectively connected to the m input ends, and the q movable strips are selectively connected to the p fixed strips. The p fixed strips include K signal input lines configured to input signals, and ends of K fixed strips act as the K second ports. A specific quantity of signal input lines may be set by persons skilled in the art according to experience and an actual situation, for example, one signal input line or a plurality of signal input lines may be set. In this application, one or more fixed strips may be set as signal input lines.

It should be noted that, that the q movable strips are selectively connected to the p fixed strips specifically means that the q movable strips may be connected to different fixed strips based on a to-be-connected radiating element by changing a position of at least one movable strip.

Based on the foregoing structure, the q movable strips in the switch element may be selectively connected to the p fixed strips, to control transmission or interruption of the signal that is output by the feeding network to the n radiating elements, and set the quantity of radiating elements in an operating state, thereby flexibly changing the beam width of the radiation directivity pattern of the antenna. To be specific, if the n radiating elements are sequentially arranged in a horizontal direction, the foregoing structure may be used to flexibly change a horizontal beam width of the antenna; if the n radiating elements are sequentially arranged in a vertical direction, the foregoing structure may be used to flexibly change a vertical beam width of the antenna; and if the n radiating elements are sequentially arranged in another direction, the foregoing structure may be used to flexibly change a beam width of the antenna in the another direction.

Further, if the feeding network includes a phase shifter, a beam direction of the antenna may be changed by changing a phase of the phase shifter. The phase shifter may change the phase by changing a dielectric constant of a signal channel, or may change the phase by changing a physical length of a signal channel, or may change the phase in another implementation.

In this application, the switch element may further include a pull rod, and the pull rod may be connected to at least one of the q movable strips, so that a position of a movable strip connected to the pull rod can be changed by using the pull rod, to selectively connect the movable strip to a fixed strip. Specifically, the pull rod may be electrically controlled, for example, by using a motor, or may be manually controlled.

It should be noted that, the aforementioned connection relationship between the pull rod and the movable strip is only an example for description. In this application, each movable strip may be connected to one pull rod, or another connection manner may be used, provided that the q movable strips can be controlled to selectively connect to the p fixed strips. A specific connection manner is not specifically limited.

In this application, the q movable strips and the p fixed strips may be metal strips with a relatively small thickness, or copper foil strips of a printed circuit board (PCB). This is not specifically limited. The q movable strips may be selectively connected to the p fixed strips in a plurality of manners, for example, in an electrical manner or capacitive coupling manner.

In this embodiment of the present application, at least two operating modes may be set by using the switching switch. In the following, only two operating modes (Embodiment 2 and Embodiment 3) and three operating modes (Embodiment 4 and Embodiment 5) set by using the switching switch are used as examples for description.

Embodiment 2

An array antenna includes two radiating elements (a radiating element 1011 and a radiating element 1012) and a feeding network. The feeding network includes a switching switch 1021, and two operating modes set by using the switching switch are shown in FIG. 2a and FIG. 2b.

Figure 2A:
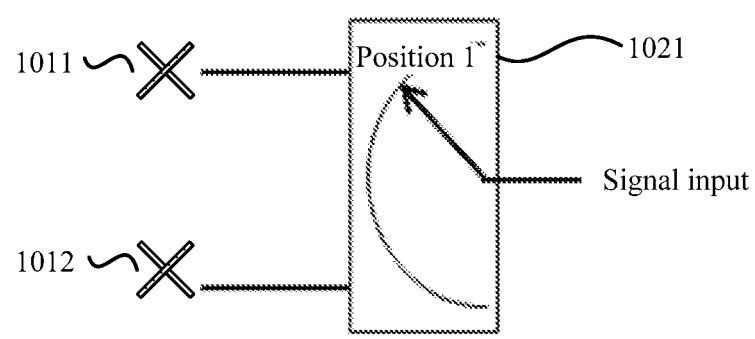
FIG. 2a is a schematic diagram of using a switching switch to control one radiating element to operate in Embodiment 2 of this application.

FIG. 2a is a schematic diagram of using a switching switch to control one radiating element to operate in Embodiment 2. As shown in FIG. 2a, when the switching switch is switched to a position 1, a signal that is output through the feeding network to the radiating element 1011 is transmitted, and a signal that is output to the radiating element 1012 is interrupted. In this case, the radiating element 1011 is in an operating state, and the radiating element 1012 is not in an operating state.

Figure 2B:
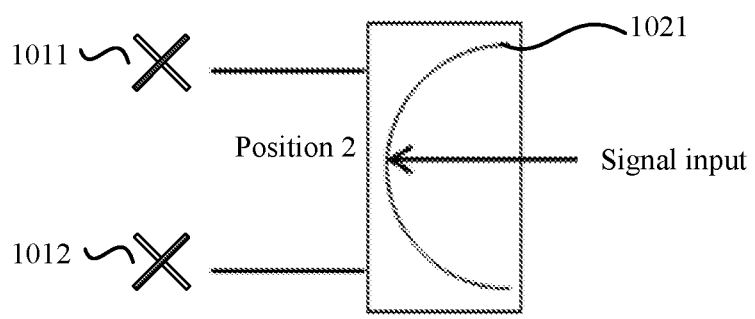
FIG. 2b is a schematic diagram of using a switching switch to control two radiating elements to operate in Embodiment 2 of this application.

FIG. 2b is a schematic diagram of using a switching switch to control two radiating elements to operate in Embodiment 2. As shown in FIG. 2b, when the switching switch is switched to a position 2, signals that are output through the feeding network to the radiating element 1011 and the radiating element 1012 are transmitted. In this case, both the radiating element 1011 and the radiating element 1012 are in an operating state.

It can be learned from the foregoing content that, a quantity of radiating elements in an operating state can be set by changing the switching switch to control transmission or interruption of a signal that is output by the feeding network to the radiating elements, thereby changing a beam width of an antenna.

Figure 2C:
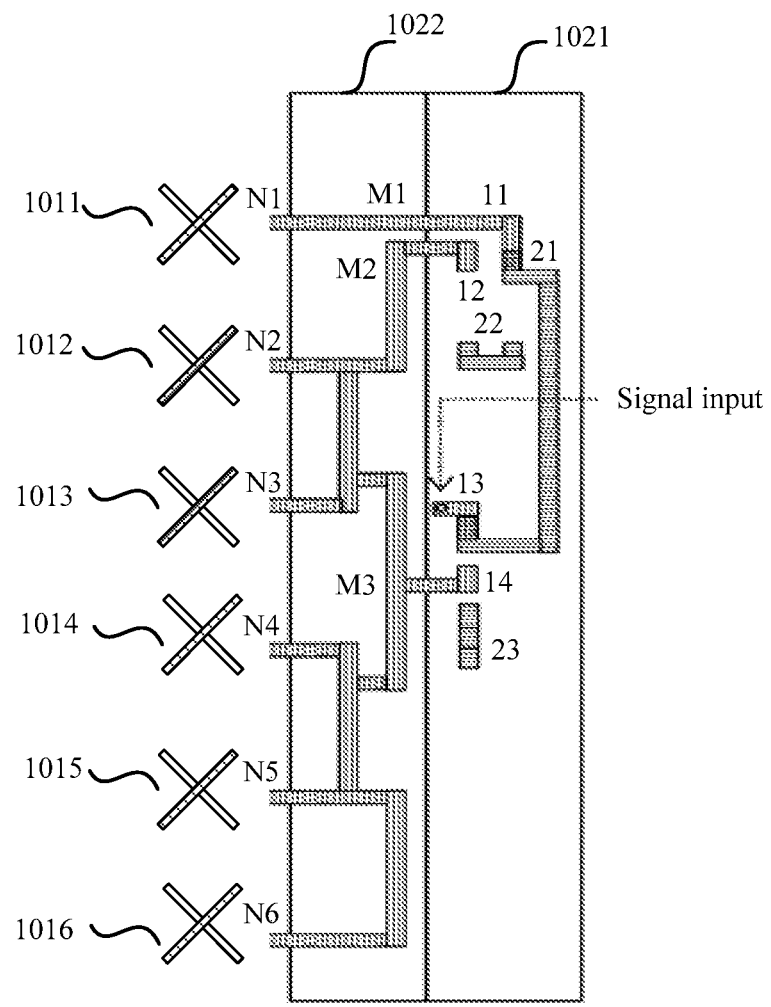
FIG. 2c is a specific schematic structural diagram of an array antenna according to Embodiment 2 of this application.

FIG. 2c is a specific schematic structural diagram of an array antenna according to Embodiment 2 of this application. As shown in FIG. 2c, the array antenna includes:

six radiating elements, for example, a radiating element 1011, a radiating element 1012, a radiating element 1013, a radiating element 1014, a radiating element 1015, and a radiating element 1016; and a feeding network, where the feeding network includes a switching switch 1021 and a power splitter 1022; the power splitter 1022 includes six output ends (N1, N2, N3, N4, N5, and N6) and three input ends (M1, M2, and M3); the six radiating elements are respectively connected to the six output ends; and M1 is connected to N1, M2 is connected to N2, N3, N4, N5, and N6, and M3 is connected to N2, N3, N4, N5, and N6.

Figure 2D:
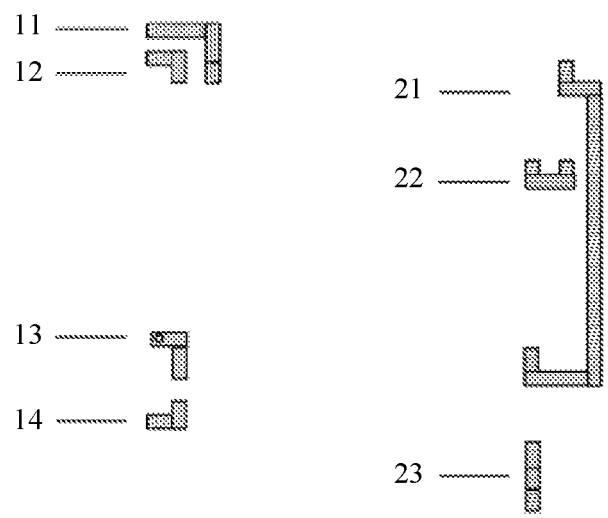
FIG. 2d is a schematic diagram of fixed strips and movable strips in Embodiment 2 of this application.

Further, the switching switch 1021 includes four fixed strips (11, 12, 13, and 14, as shown in FIG. 2d) and q movable strips (21, 22, and 23, as shown in FIG. 2d). Three of the four fixed strips are respectively connected to the three input ends, that is, 11 is connected to M1, 12 is connected to M2, and 14 is connected to M3; and the fixed strip 13 is a signal input line.

Figure 2E:
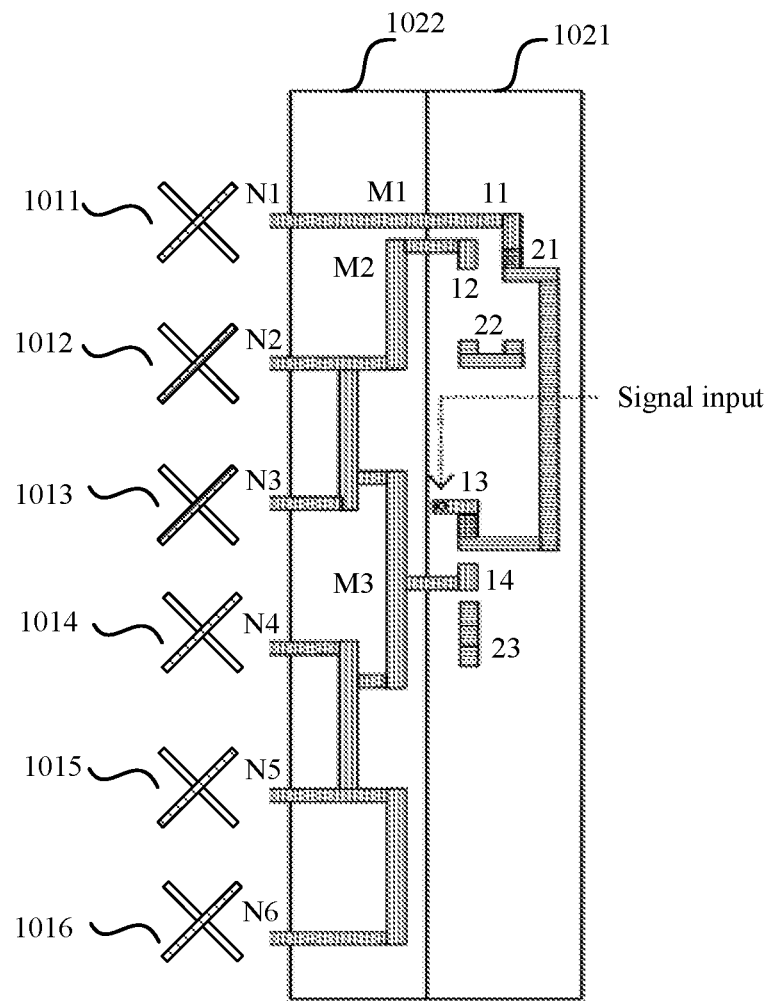
FIG. 2e is a schematic diagram of using a switching switch to control one radiating element to operate in Embodiment 2 of this application.
Figure 2F:
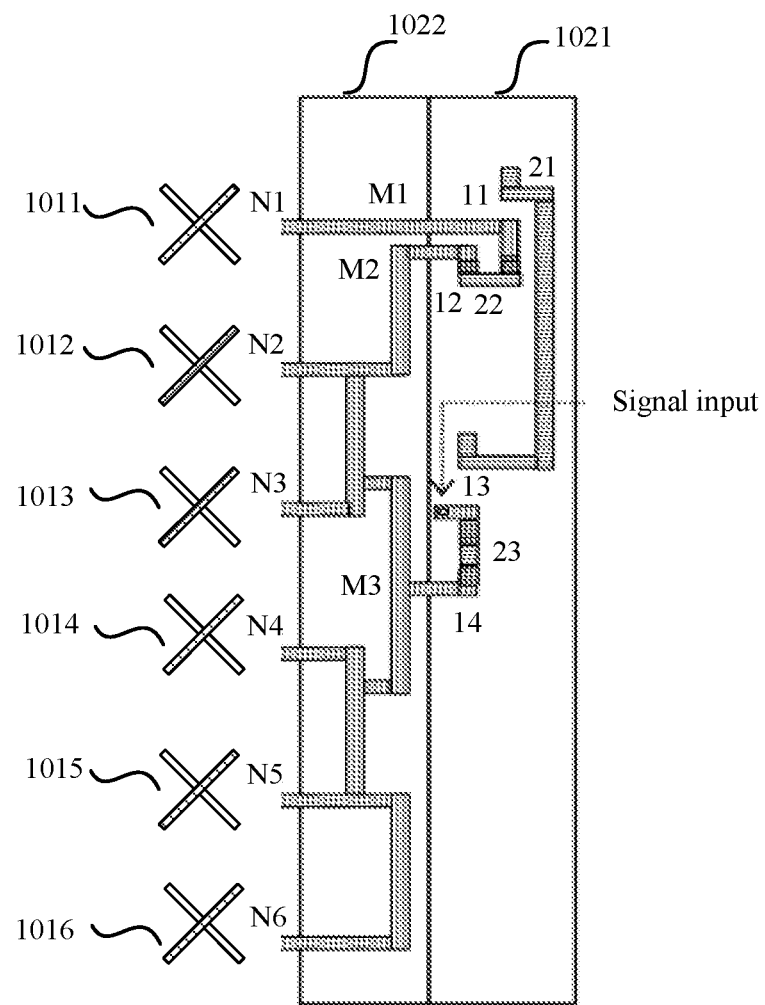
FIG. 2f is a schematic diagram of using a switching switch to control six radiating elements to operate in Embodiment 2 of this application.

Based on the foregoing structure, a fixed strip connected to a movable strip may be changed by changing a position of the movable strip, so as to control transmission or interruption of a signal that is output by the feeding network to the six radiating elements, and set the quantity of radiating elements in an operating state, that is, set different operating modes as shown in FIG. 2e and FIG. 2f, thereby flexibly changing a beam width of a radiation directivity pattern of an antenna.

FIG. 2e is a schematic diagram of using a switching switch to control one radiating element to operate in Embodiment 2. As shown in FIG. 2e, the movable strip 21 is connected to the fixed strip 11 and the fixed strip 13 in a direct electrical connection or capacitive coupling manner to implement signal connection. In this case, only the radiating element 1011 is in a signal-transmittable state with the feeding network, and therefore the radiating element 1011 is in an operating state. At this time, because the quantity of radiating elements in an operating state is smallest, the beam width of the directivity pattern of the antenna is widest, and the antenna is suitable for a high-rise building coverage scenario.

FIG. 2f is a schematic diagram of using a switching switch to control six radiating elements to operate in Embodiment 2. As shown in FIG. 2f, the movable strip 22 is connected to the fixed strip 11 and the fixed strip 12 in a direct electrical connection or capacitive coupling manner to implement signal connection, and the movable strip 23 is connected to the fixed strip 13 and the fixed strip 14 in a direct electrical connection or capacitive coupling manner to implement signal connection. In this case, the radiating element 1011, the radiating element 1012, the radiating element 1013, the radiating element 1014, the radiating element 1015, and the radiating element 1016 are all in a signal-transmittable state with the feeding network, and therefore the radiating element 1011, the radiating element 1012, the radiating element 1013, the radiating element 1014, the radiating element 1015, and the radiating element 1016 are all in an operating state. At this time, because the quantity of radiating elements in an operating state is largest, the beam width of the directivity pattern of the antenna is narrowest, and the antenna is suitable for a street macro-coverage scenario.

Embodiment 3

Figure 3A:
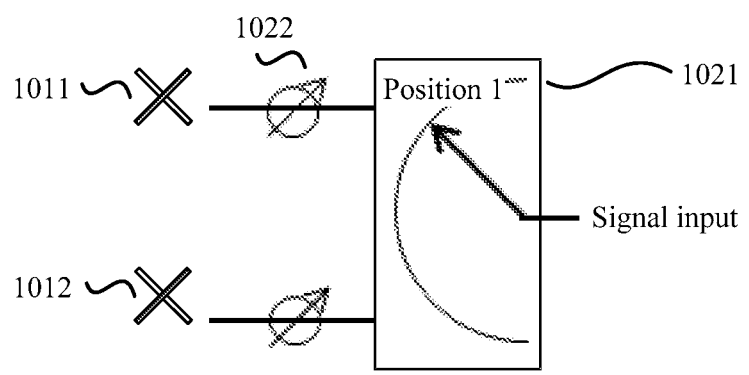
FIG. 3a is a schematic diagram of using a switching switch to control one radiating element to operate in Embodiment 3 of this application.
Figure 3B:
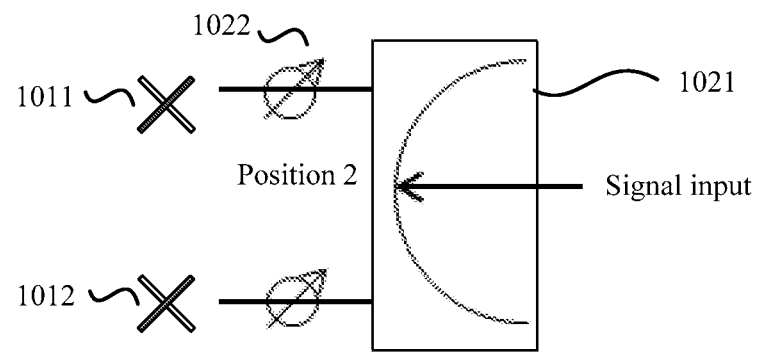
FIG. 3b is a schematic diagram of using a switching switch to control two radiating elements to operate in Embodiment 3 of this application.

An array antenna includes two radiating elements (a radiating element 1011 and a radiating element 1012) and a feeding network. The feeding network includes a switching switch 1021 and a phase shifter 1022, and two operating modes set by using the switching switch are shown in FIG. 3a and FIG. 3b. A direction of an antenna beam may be changed by changing a phase of the phase shifter. The phase shifter may change the phase by changing a dielectric constant of a signal channel, or may change the phase by changing a physical length of a signal channel, or may change the phase in another implementation.

FIG. 3a is a schematic diagram of using a switching switch to control one radiating element to operate in Embodiment 3. As shown in FIG. 3a, when the switching switch is switched to a position 1, a signal that is output through the feeding network to the radiating element 1011 is transmitted, and a signal that is output to the radiating element 1012 is interrupted. In this case, the radiating element 1011 is in an operating state, and the radiating element 1012 is not in an operating state.

FIG. 3b is a schematic diagram of using a switching switch to control two radiating elements to operate in Embodiment 3. As shown in FIG. 3b, when the switching switch is switched to a position 2, signals that are output through the feeding network to the radiating element 1011 and the radiating element 1012 are transmitted. In this case, both the radiating element 1011 and the radiating element 1012 are in an operating state.

It can be learned from the foregoing content that, a quantity of radiating elements in an operating state can be set by changing the switching switch to control transmission or interruption of a signal that is output by the feeding network to the radiating elements, thereby changing a beam width of an antenna.

For a specific schematic structural diagram of the array antenna in Embodiment 3, refer to FIG. 2c in the foregoing Embodiment 2, provided that "power splitter" is changed to "phase shifter". Details are not described herein.

Embodiment 4

An array antenna includes three radiating elements (a radiating element 1011, a radiating element 1012, and a radiating element 1013) and a feeding network. The feeding network includes a switching switch 1021, and three operating modes set by using the switching switch are shown in FIG. 4*a* to FIG. 4*c*.

Figure 4A:
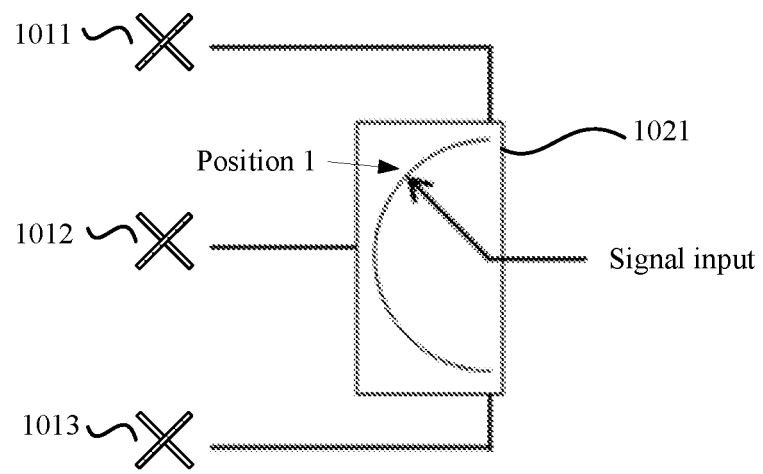
FIG. 4a is a schematic diagram of using a switching switch to control one radiating element to operate in Embodiment 4 of this application.

FIG. 4*a* is a schematic diagram of using a switching switch to control one radiating element to operate in Embodiment 4. As shown in FIG. 4*a*, when the switching switch is switched to a position 1, a signal that is output through the feeding network to the radiating element 1011 is transmitted, and signals that are output to the radiating element 1012 and the radiating element 1013 are interrupted. In this case, the radiating element 1011 is in an operating state, and the radiating element 1012 and the radiating element 1013 are not in an operating state.

Figure 4B:
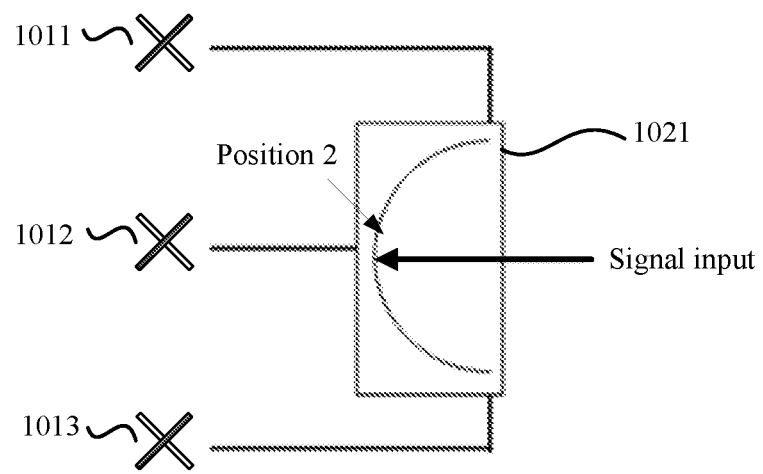
FIG. 4b is a schematic diagram of using a switching switch to control two radiating elements to operate in Embodiment 4 of this application.

FIG. 4*b* is a schematic diagram of using a switching switch to control two radiating elements to operate in Embodiment 4. As shown in FIG. 4*b*, when the switching switch is switched to a position 2, signals that are output through the feeding network to the radiating element 1011 and the radiating element 1012 are transmitted, and a signal that is output to the radiating element 1013 is interrupted. In this case, the radiating element 1011 and the radiating element 1012 are in an operating state, and the radiating element 1013 is not in an operating state.

Figure 4C:
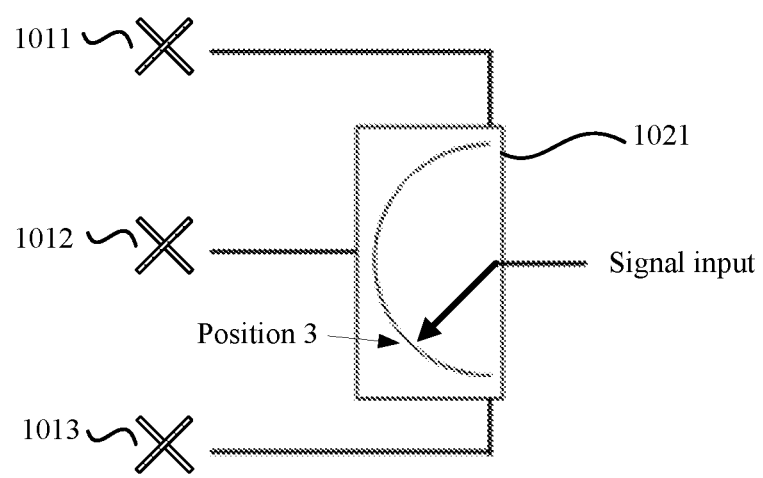
FIG. 4c is a schematic diagram of using a switching switch to control three radiating elements to operate in Embodiment 4 of this application.

FIG. 4*c* is a schematic diagram of using a switching switch to control three radiating elements to operate in Embodiment 4. As shown in FIG. 4*c*, when the switching switch is switched to a position 3, signals that are output through the feeding network to the radiating element 1011, the radiating element 1012, and the radiating element 1013 are all transmitted. In this case, the radiating element 1011, the radiating element 1012, and the radiating element 1013 are all in an operating state.

It can be learned from the foregoing content that, a quantity of radiating elements in an operating state can be set by changing the switching switch to control transmission or interruption of a signal that is output by the feeding network to the radiating elements, thereby changing a beam width of an antenna.

Figure 4D:
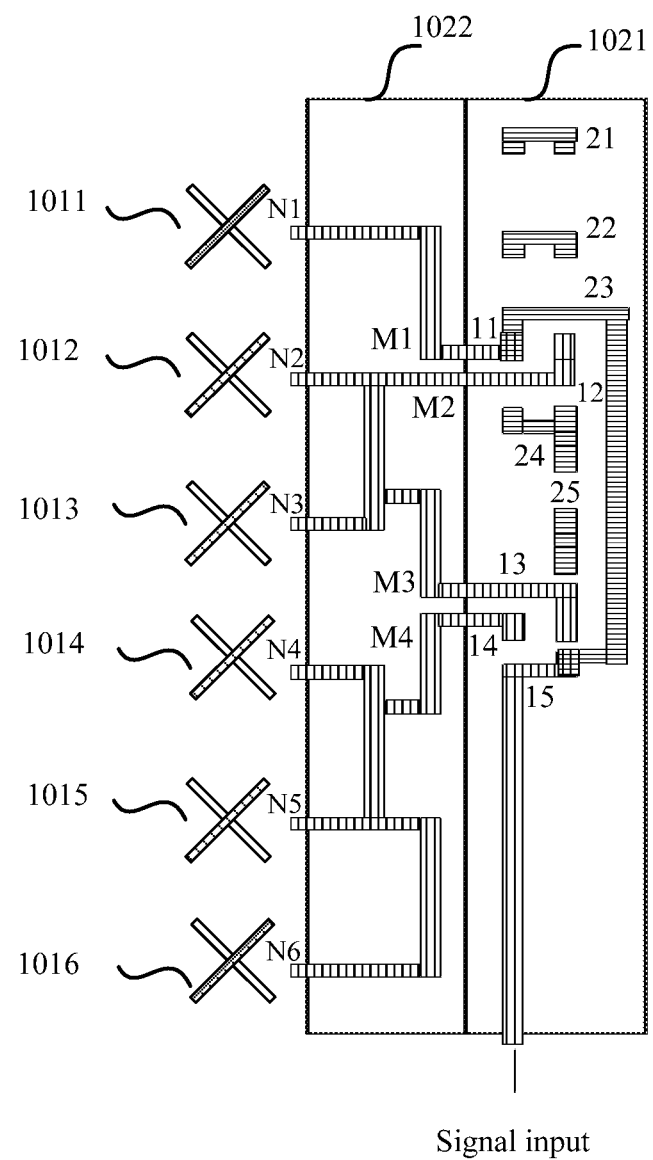
FIG. 4d is a specific schematic structural diagram of an array antenna according to Embodiment 4 of this application.

FIG. 4*d* is a specific schematic structural diagram of an array antenna according to Embodiment 4 of this application. As shown in FIG. 4*d*, the array antenna includes:

six radiating elements, for example, a radiating element 1011, a radiating element 1012, a radiating element 1013, a radiating element 1014, a radiating element 1015, and a radiating element 1016; and a feeding network, where the feeding network includes a switching switch 1021 and a power splitter 1022; the power splitter 1022 includes six output ends (N1, N2, N3, N4, N5, and N6) and four input ends (M1, M2, M3, and M4); the six radiating elements are respectively connected to the six output ends; and M1 is connected to N1, M2 is connected to N2 and N3, M3 is connected to N2 and N3, and M4 is connected to N4, N5, and N6.

Figure 4E:
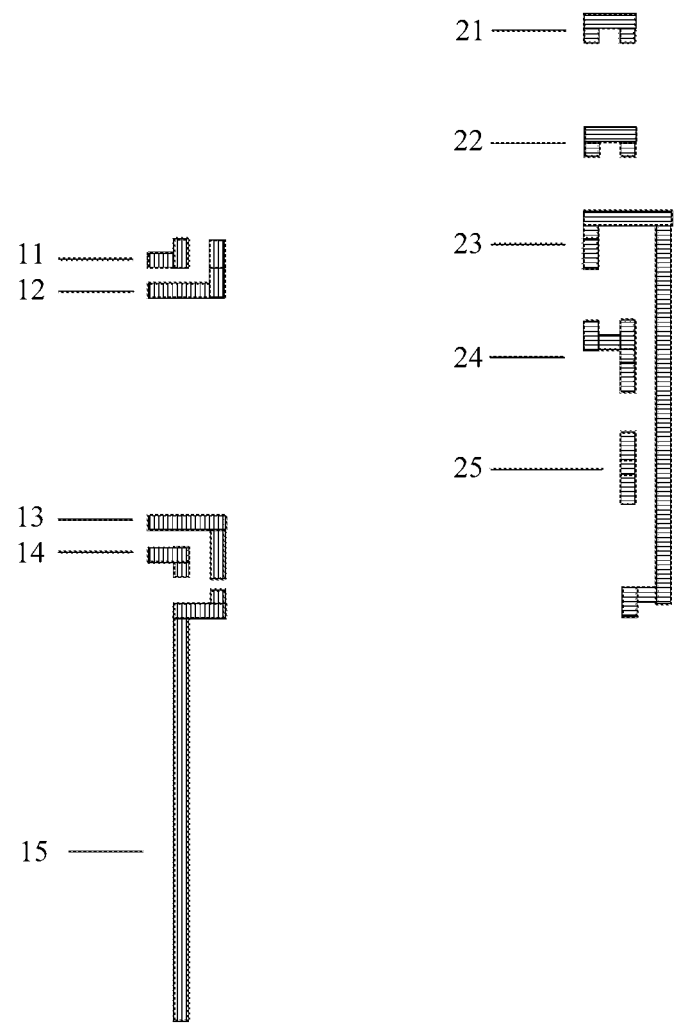
FIG. 4e is a schematic diagram of fixed strips and movable strips in Embodiment 4 of this application.

Further, the switching switch 1021 includes five fixed strips (11, 12, 13, 14, and 15, as shown in FIG. 4*e*) and q movable strips (21, 22, 23, 24, and 25, as shown in FIG. 4*e*). Four of the five fixed strips are respectively connected to the four input ends, that is, 11 is connected to M1, 12 is connected to M2, 13 is connected to M3, and 14 is connected to M4.

Based on the foregoing structure, a fixed strip connected to a movable strip may be changed by changing a position of the movable strip, so as to control transmission or interruption of a signal that is output by the feeding network to the six radiating elements, and set the quantity of radiating elements in an operating state, thereby flexibly changing a beam width of a radiation directivity pattern of the antenna.

Figure 4F:
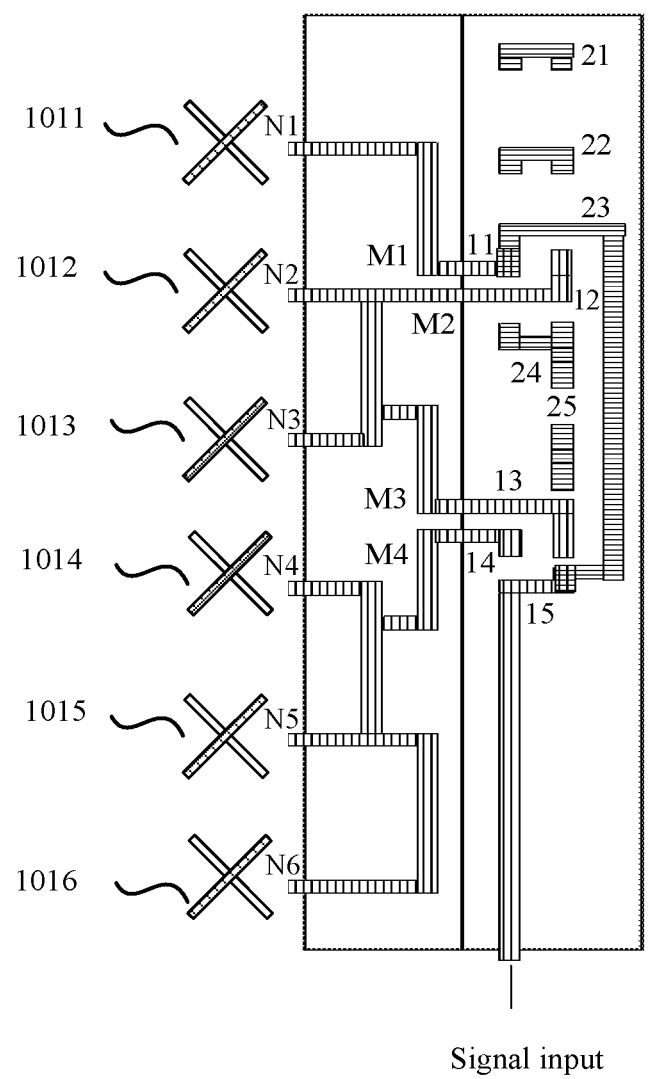
FIG. 4f is a schematic diagram of using a switching switch to control one radiating element to operate in Embodiment 4 of this application.
Figure 4G:
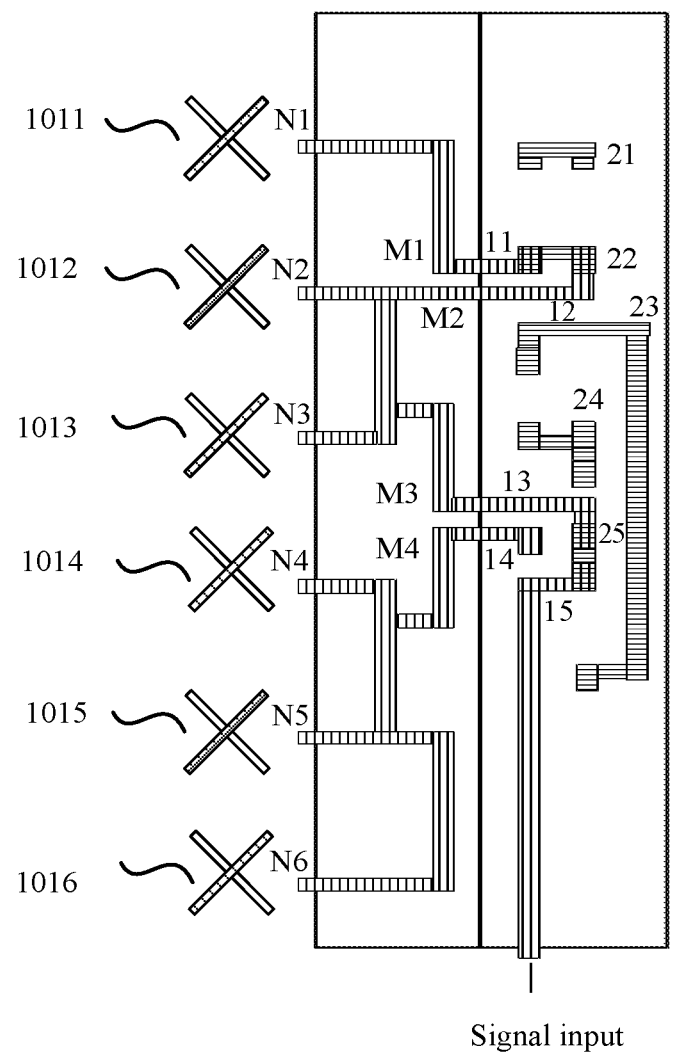
FIG. 4g is a schematic diagram of using a switching switch to control three radiating elements to operate in Embodiment 4 of this application.
Figure 4H:
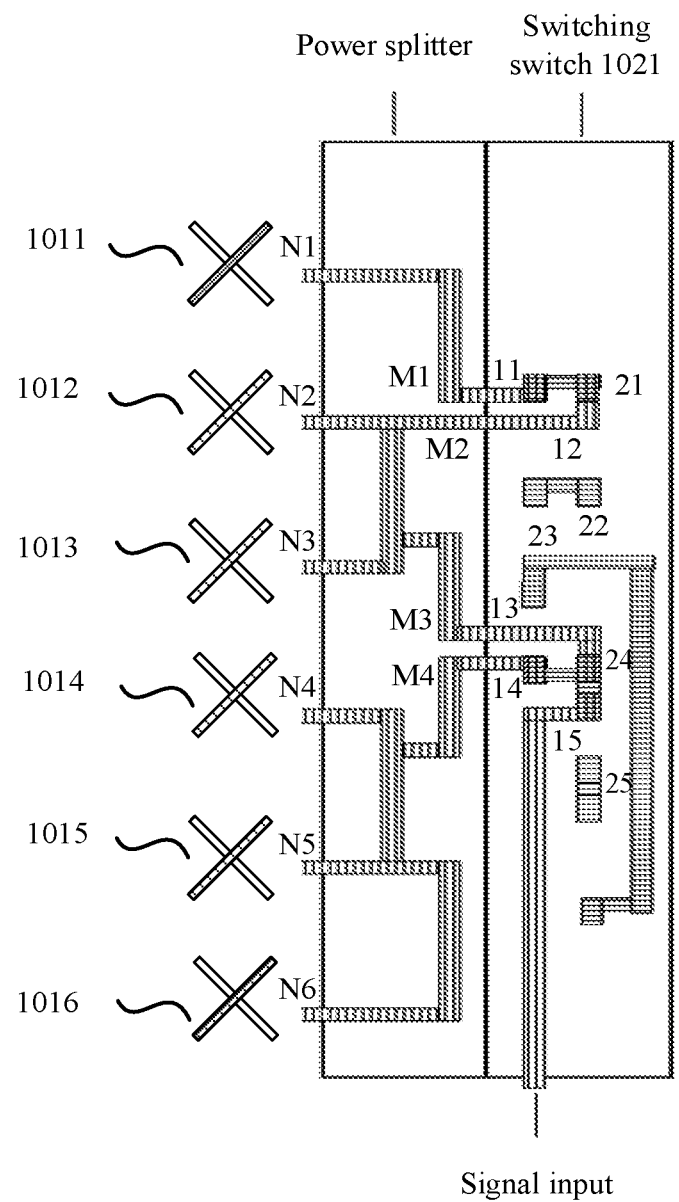
FIG. 4h is a schematic diagram of using a switching switch to control six radiating elements to operate in Embodiment 4 of this application.

FIG. 4*f* to FIG. 4*h* are schematic diagrams of controlling radiating elements to be in different operating states by using a switching switch.

FIG. 4*f* is a schematic diagram of using a switching switch to control one radiating element to operate in Embodiment 4. As shown in FIG. 4*f*, the movable strip 23 is connected to the fixed strip 11 and the fixed strip 15 in a direct electrical connection or capacitive coupling manner to implement signal connection. In this case, only the radiating element 1011 is in a signal-transmittable state with the feeding network, and therefore the radiating element 1011 is in an operating state. At this time, because the quantity of radiating elements in an operating state is smallest, the beam width of the directivity pattern of the antenna is widest, and the antenna is suitable for a high-rise building coverage scenario.

FIG. 4*g* is a schematic diagram of using a switching switch to control three radiating elements to operate in Embodiment 4. As shown in FIG. 4*g*, the movable strip 22 is connected to the fixed strip 11 and the fixed strip 12 in a direct electrical connection or capacitive coupling manner to implement signal connection, and the movable strip 25 is connected to the fixed strip 13 and the fixed strip 15 in a direct electrical connection or capacitive coupling manner to implement signal connection. In this case, only the radiating element 1011, the radiating element 1012, and the radiating element 1013 are in a signal-transmittable state with the feeding network, and therefore the radiating element 1011, the radiating element 1012, and the radiating element 1013 are in an operating state. At this time, because the quantity of radiating elements in an operating state is medium, the beam width of the directivity pattern of the antenna is medium, and the antenna is suitable for a mid- and low-rise building coverage scenario.

FIG. 4*h* is a schematic diagram of using a switching switch to control six radiating elements to operate in Embodiment 4. As shown in FIG. 4*h*, the movable strip 21 is connected to the fixed strip 11 and the fixed strip 12 in a direct electrical connection or capacitive coupling manner to implement signal connection, and the movable strip 24 is connected to the fixed strip 13, the fixed strip 14, and the fixed strip 15 in a direct electrical connection or capacitive coupling manner to implement signal connection. In this case, the radiating element 1011, the radiating element 1012, the radiating element 1013, the radiating element 1014, the radiating element 1015, and the radiating element 1016 are all in a signal-transmittable state with the feeding network, and therefore the radiating element 1011, the radiating element 1012, the radiating element 1013, the radiating element 1014, the radiating element 1015, and the radiating element 1016 are all in an operating state. At this time, because the quantity of radiating elements in an operating state is largest, the beam width of the directivity pattern of the antenna is narrowest, and the antenna is suitable for a street macro-coverage scenario.

Embodiment 5

Figure 5A:
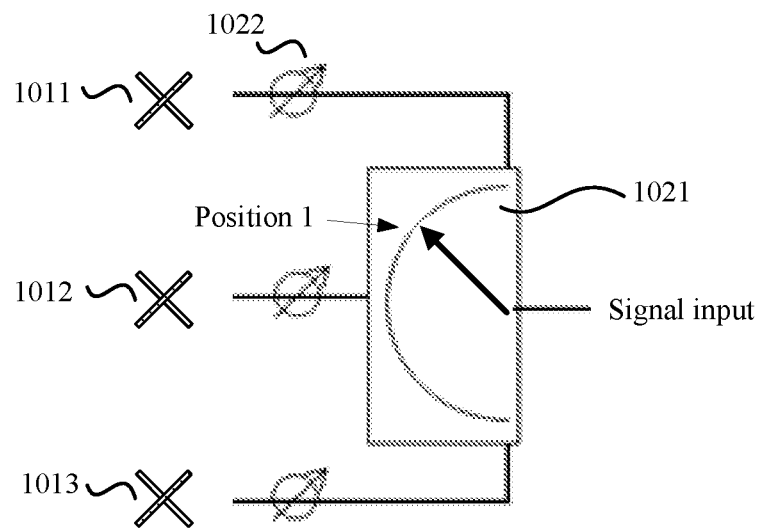
FIG. 5a is a schematic diagram of using a switching switch to control one radiating element to operate in Embodiment 5 of this application.
Figure 5B:
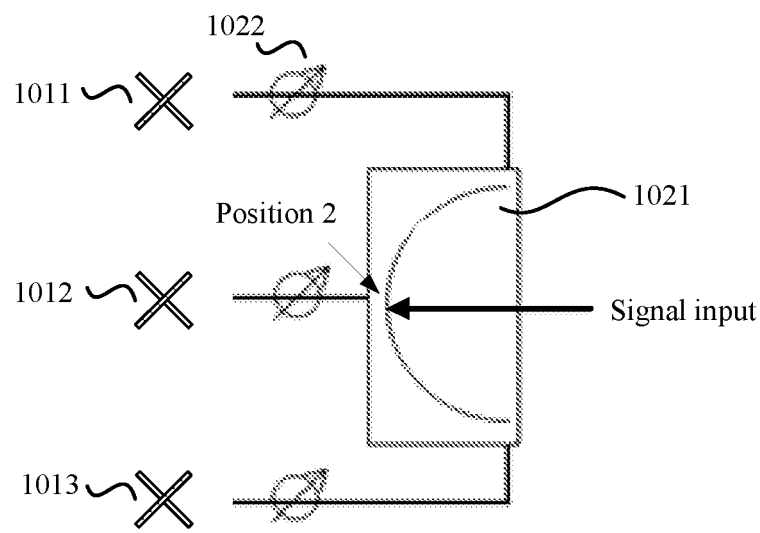
FIG. 5b is a schematic diagram of using a switching switch to control two radiating elements to operate in Embodiment 5 of this application.

An array antenna includes three radiating elements (a radiating element 1011, a radiating element 1012, and a radiating element 1013) and a feeding network. The feeding network includes a switching switch 1021 and a phase shifter 1022, and two operating modes set by using the switching switch are shown in FIG. 5*a* and FIG. 5*b*. A direction of an antenna beam may be changed by changing a phase of the phase shifter. The phase shifter may change the phase by changing a dielectric constant of a signal channel, or may change the phase by changing a physical length of a signal channel, or may change the phase in another implementation.

FIG. 5a is a schematic diagram of using a switching switch to control one radiating element to operate in Embodiment 5. As shown in FIG. 5a, when the switching switch is switched to a position 1, a signal that is output through the feeding network to the radiating element 1011 is transmitted, and signals that are output to the radiating element 1012 and the radiating element 1013 are interrupted. In this case, the radiating element 1011 is in an operating state, and the radiating element 1012 and the radiating element 1013 are not in an operating state.

FIG. 5b is a schematic diagram of using a switching switch to control two radiating elements to operate in Embodiment 5. As shown in FIG. 5b, when the switching switch is switched to a position 2, signals that are output through the feeding network to the radiating element 1011 and the radiating element 1012 are transmitted, and a signal that is output to the radiating element 1013 is interrupted. In this case, the radiating element 1011 and the radiating element 1012 are in an operating state, and the radiating element 1013 is not in an operating state.

Figure 5C:
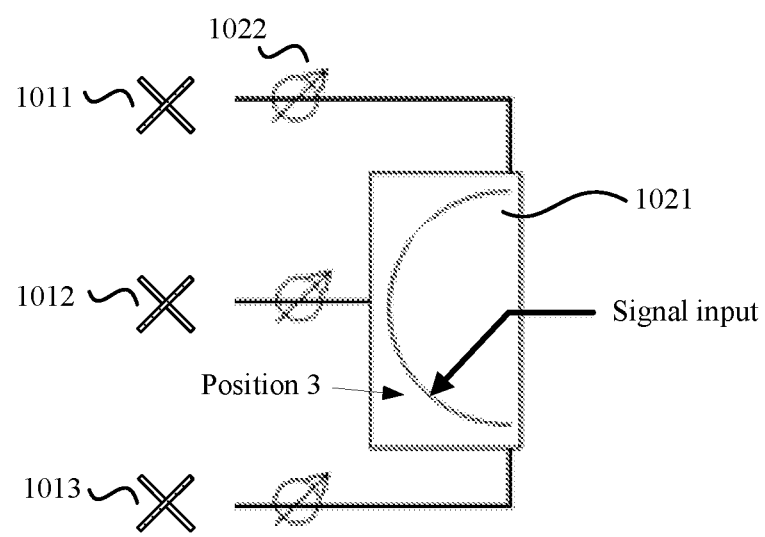
FIG. 5c is a schematic diagram of using a switching switch to control three radiating elements to operate in Embodiment 5 of this application.

FIG. 5c is a schematic diagram of using a switching switch to control three radiating elements to operate in Embodiment 5. As shown in FIG. 5c, when the switching switch is switched to a position 3, signals that are output through the feeding network to the radiating element 1011, the radiating element 1012, and the radiating element 1013 are all transmitted. In this case, the radiating element 1011, the radiating element 1012, and the radiating element 1013 are all in an operating state.

It can be learned from the foregoing content that, a quantity of radiating elements in an operating state can be set by changing the switching switch to control transmission or interruption of a signal that is output by the feeding network to the radiating elements, thereby changing a beam width of an antenna.

For a specific schematic structural diagram of the array antenna in Embodiment 5, refer to FIG. 4d in the foregoing Embodiment 4, provided that "power splitter" is changed to "phase shifter". Details are not described herein.

This application further provides a network device, including the array antenna described in the foregoing embodiments.

Although some embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An antenna, comprising:
n radiating elements;
a power splitter or a phase shifter, comprising n output ends and m input ends, wherein the n output ends are respectively connected to the n radiating elements, and any one of the m input ends is connected to at least one of then output ends; and
a switching switch, comprising m first ports, K second ports, and a switch element, wherein the m first ports are respectively connected to the m input ends; the K second ports are configured to couple an input signal; and the switch element is configured to switch a connection relationship between the m first ports and the K second ports, so as to selectively output the input signal to at least one first port, wherein
n and m are integers greater than 1, and K is an integer greater than or equal to 1.

2. The antenna according to claim 1, wherein the switch element comprises p fixed strips and q movable strips; and
ends of m fixed strips in the p fixed strips act as the m first ports, the q movable strips are selectively connected to the p fixed strips, and m≤p.

3. The antenna according to claim 2, wherein the switch element further comprises a pull rod, and the pull rod is connected to at least one of the q movable strips.

4. The antenna according to claim 2, wherein the q movable strips are selectively connected to the p fixed strips in an electrical manner or capacitive coupling manner.

5. The antenna according to claim 2, wherein both the p fixed strips and the q movable strips are metal strips or copper foil strips of a printed circuit board (PCB).

6. The antenna according to claim 2, wherein ends of K fixed strips in the p fixed strips act as the K second ports, and K≤p.

7. The antenna according to claim 6, wherein the p fixed strips comprise a first fixed strip to a fourth fixed strip, wherein the first fixed strip, the second fixed strip, and the fourth fixed strip are respectively connected to first input end, second input end, and third input end, and an end of the third fixed strip acts as the second port; and the q movable strips comprise a first movable strip to a third movable strip; and
that the q movable strips are selectively connected to the p fixed strips is specifically:
the first movable strip is connected to the first fixed strip and the third fixed strip; or
the second movable strip is connected to the first fixed strip and the second fixed strip, and the third movable strip is connected to the third fixed strip and the fourth fixed strip.

8. The antenna according to claim 7, wherein the n output ends comprise a first output end to a sixth output end, and the m input ends comprise the first input end to the third input end, wherein
the first input end is connected to the first output end;
the second input end is connected to the second output end, the third output end, the fourth output end, the fifth output end, and the sixth output end; and
the third input end is connected to the second output end, the third output end, the fourth output end, the fifth output end, and the sixth output end.

9. The antenna according to claim 6, wherein the p fixed strips comprise a first fixed strip to a fifth fixed strip, wherein the first fixed strip to the fourth fixed strip are respectively connected to first input end to fourth input end, and an end of the fifth fixed strip acts as the second port; and the q movable strips comprise a first movable strip to a fifth movable strip; and
that the q movable strips are selectively connected to the p fixed strips is specifically:

the third movable strip is connected to the first fixed strip and the fifth fixed strip; or the second movable strip is connected to the first fixed strip and the second fixed strip, and the fifth movable strip is connected to the third fixed strip and the fifth fixed strip; or the first movable strip is connected to the first fixed strip and the second fixed strip, and the fourth movable strip is connected to the third fixed strip, the fourth fixed strip, and the fifth fixed strip.

10. The antenna according to claim 9, wherein the n output ends comprise a first output end to a sixth output end, and the m input ends comprise the first input end to the fourth input end, wherein the first input end is connected to the first output end;

the second input end is connected to the second output end and the third output end;

the third input end is connected to the second output end and the third output end; and the fourth input end is connected to the fourth output end, the fifth output end, and the sixth output end.

11. The antenna according to claim 1, wherein the n radiating elements are sequentially arranged in a horizontal direction or in a vertical direction.

* * * * *